United States Patent
Linkner, Jr. et al.

(10) Patent No.: US 6,345,870 B1
(45) Date of Patent: Feb. 12, 2002

(54) CONTROL VALVE FOR A HYDRAULIC CONTROL UNIT

(75) Inventors: Herbert L. Linkner, Jr., Dexter; Wendell D. Tackett, Ann Arbor, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/428,933

(22) Filed: Oct. 28, 1999

(51) Int. Cl.⁷ .................................................. B60T 8/36
(52) U.S. Cl. ................ 303/119.2; 251/129.15; 251/129.02
(58) Field of Search .......................... 303/119.1, 119.2, 303/119.3; 251/129.15, 129.02, 129.08

(56) References Cited

U.S. PATENT DOCUMENTS

| | | | | |
|---|---|---|---|---|
| 4,021,125 A | * | 5/1977 | Toyoda | 417/417 |
| 4,676,478 A | * | 6/1987 | Kiuchi | 251/129.08 |
| 4,778,112 A | * | 10/1988 | De Concini et al. | 239/585 |
| 5,234,030 A | * | 8/1993 | Kervagoret et al. | 137/596.17 |
| 5,404,791 A | * | 4/1995 | Kervagoret et al. | 91/433 |
| 5,445,446 A | * | 8/1995 | Yamamuro | 303/117.1 |
| 5,669,675 A | * | 9/1997 | Mueller et al. | 303/119.2 |
| 5,752,750 A | * | 5/1998 | Lubischer et al. | 303/119.2 |
| 5,915,799 A | * | 6/1999 | Bourlon et al. | 303/119.2 |
| 6,021,996 A | * | 2/2000 | Nakayoshi | 251/30.02 |
| 6,065,734 A | * | 5/2000 | Tackett et al. | 251/129.02 |

FOREIGN PATENT DOCUMENTS

DE 197 00 979 A1 7/1998

* cited by examiner

Primary Examiner—Robert J. Oberleitner
Assistant Examiner—Xuan Lan Nguyen
(74) Attorney, Agent, or Firm—MacMillan, Sobanski & Todd, LLC

(57) ABSTRACT

A control valve for controlling fluid flow in a hydraulic control unit of a vehicular brake system includes a flux tube having an end cap, a thick tube section, and a thin tube section defining an interior volume. An armature is slidably received in the interior volume of the flux tube. A coil is provided about the flux tube. A collar covers a portion of the thin tube section and is spaced from the thick tube section so that an air gap is provided between the coil and the portion of the thin tube section not covered by the collar.

21 Claims, 5 Drawing Sheets

CONTROL VALVE FOR A HYDRAULIC CONTROL UNIT

BACKGROUND OF THE INVENTION

This invention relates in general to vehicular brake systems, and in particular is concerned with a control valve mounted on a hydraulic control unit of an electronically controlled brake system.

Electronically controlled brake systems for vehicles are well known. One type of electronically-controlled brake system includes a hydraulic control unit (HCU) connected in fluid communication between a master cylinder and a plurality of wheel brakes. The HCU includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a flux tube or sleeve for movement relative to a valve seat. A spring is used to bias the armature in an open or closed position, thereby permitting or blocking fluid flow through the valve, respectively. A coil subassembly is provided about the flux tube. When the valve is energized, an electromagnetic flux generated by the coil subassembly slides the armature from the biased open or closed position to a closed or open position, respectively.

Control valves mounted on a HCU are actuated by an electronic control module to provide desired braking functions such as anti-lock braking, traction control, and vehicle stability control.

It is desirable that a control valve provides fluid control in a manner proportional to the amount of current applied to the coil subassembly. Such proportional control valves result in enhanced performance of an electronically controlled brake system. Furthermore, it is desirable that a control valve be easily assembled to reduce costs.

SUMMARY OF THE INVENTION

This invention relates to a control valve mounted on a hydraulic control unit of a vehicular brake system. The control valve includes a symetrically-formed armature slidably received in a flux tube. The flux tube includes an end cap, a thick tube section, and a thin tube section. The flux tube is pressed into a collar of a valve seat or adapter. The collar and flux tube are sized so that an air gap is provided between a portion of the thin tube section and a coil. The thin tube section and air gap result in the concentration of an electronic flux in the thick tube section and collar. Concentration of the magnetic flux in these areas produces desired magnetic reactions of the control valve. The control valve is economical to manufacture and relatively easy to assembly.

In a preferred embodiment, a control valve for controlling fluid flow in a hydraulic control unit of a vehicular brake system includes a flux tube having an end cap, a thick tube section, and a thin tube section defining an interior volume. An armature is slidably received in the interior volume of the flux tube. A coil is provided about the flux tube. A collar covers a portion of the thin tube section and is spaced from the thick tube section so that an air gap is provided between the coil and the portion of the thin tube section not covered by the collar.

This control valve is particularly adapted to be mounted in a bore of a housing of a hydraulic control unit of an electronically controlled vehicular brake system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
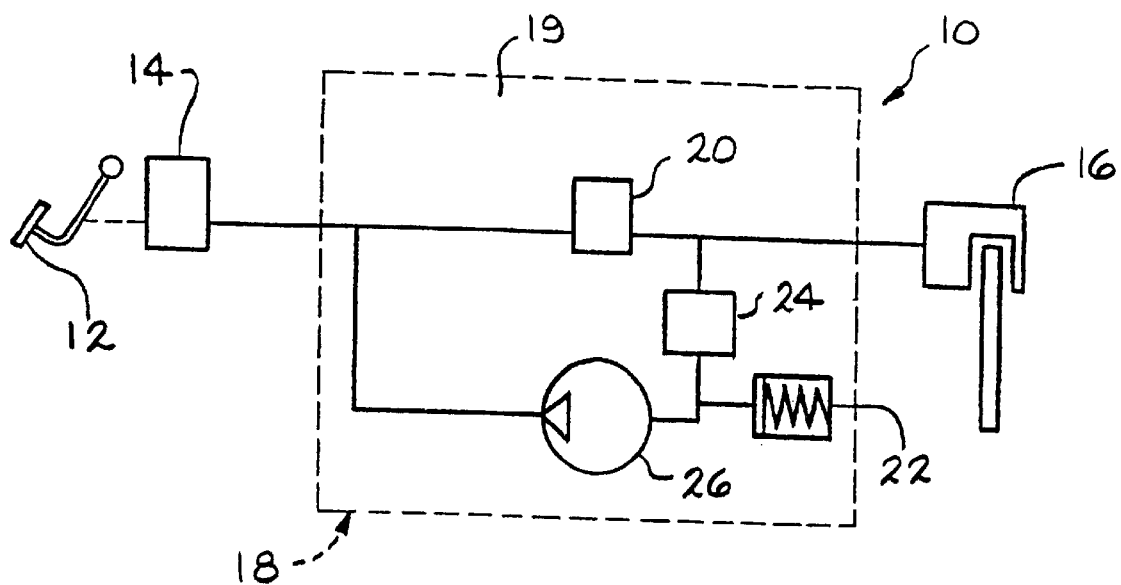
FIG. 1 is a schematic diagram of a vehicular braking system according to the present invention illustrating a hydraulic control unit including a normally open control valve, a normally closed control valve, an accumulator, and a pump.

A vehicular brake system according to this invention is indicated generally at 10 in FIG. 1. System 10 includes valves and other components described below to provide an anti-lock braking function. In other embodiments, system 10 can also include components to provide traction control and/or vehicle stability control functions. In yet other embodiments, system 10 can be formed as an electronic brake management system.

The brake system 10 includes a brake pedal 12 connected to a master cylinder 14 for providing pressurized brake fluid to a plurality of wheel brakes 16, only one of which is shown. The wheel brake 16 is illustrated as a disc brake. However, the wheel brake 16 may be any type found on vehicles including a drum brake.

The brake system 10 also includes a hydraulic control unit (HCU) 18 connected in fluid communication between the master cylinder 14 and each wheel brake 16. The HCU 18 includes a housing 19 having bores for receiving control valves and other components described below. Fluid conduits are provided between the bores to provide fluid communication between the valves and other components. For purposes of clarity of illustration, only one set of components are illustrated in FIG. 1. Typically, however, the HCU 18 also houses corresponding components for other circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 connected between the low pressure accumulator 22 and an inlet to control valve 20. The HCU 18 may also include other fluid flow devices such as an attenuator (not illustrated), depending upon the system design. Control valve 20 is preferably formed as a proportional solenoid valve switchable between two positions. Control valve 24 is preferably formed as a solenoid valve switchable between two positions. Valves 20 and 24, as well as pump 26, are electrically connected to an electronic control module (not illustrated) and operated to provide desired system braking in a well-known manner.

Figure 2:
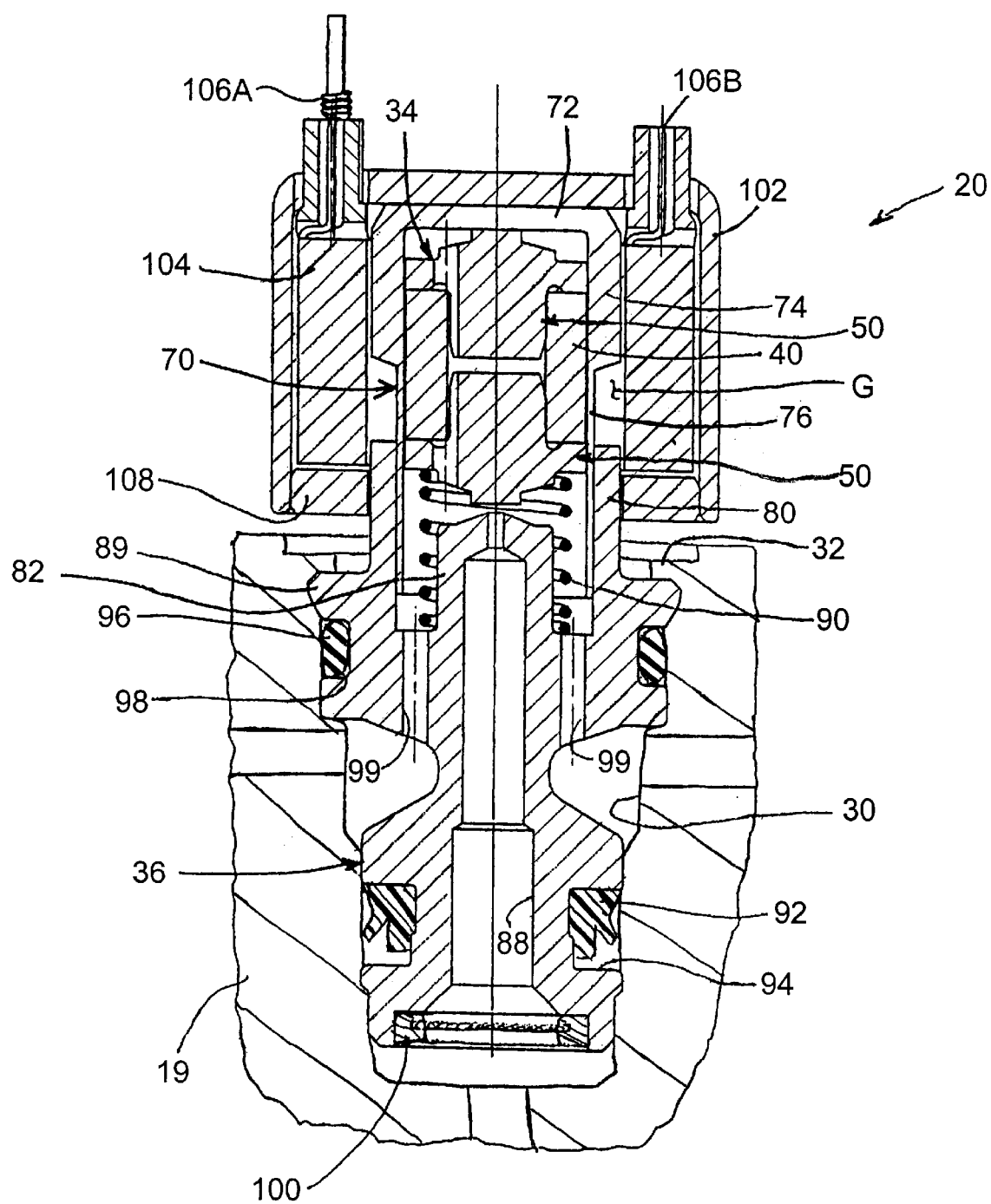
FIG. 2 is a sectional view through a portion of the hydraulic control unit of FIG. 1 illustrating a first embodiment of the normally open control valve according to this invention.
Figure 3:
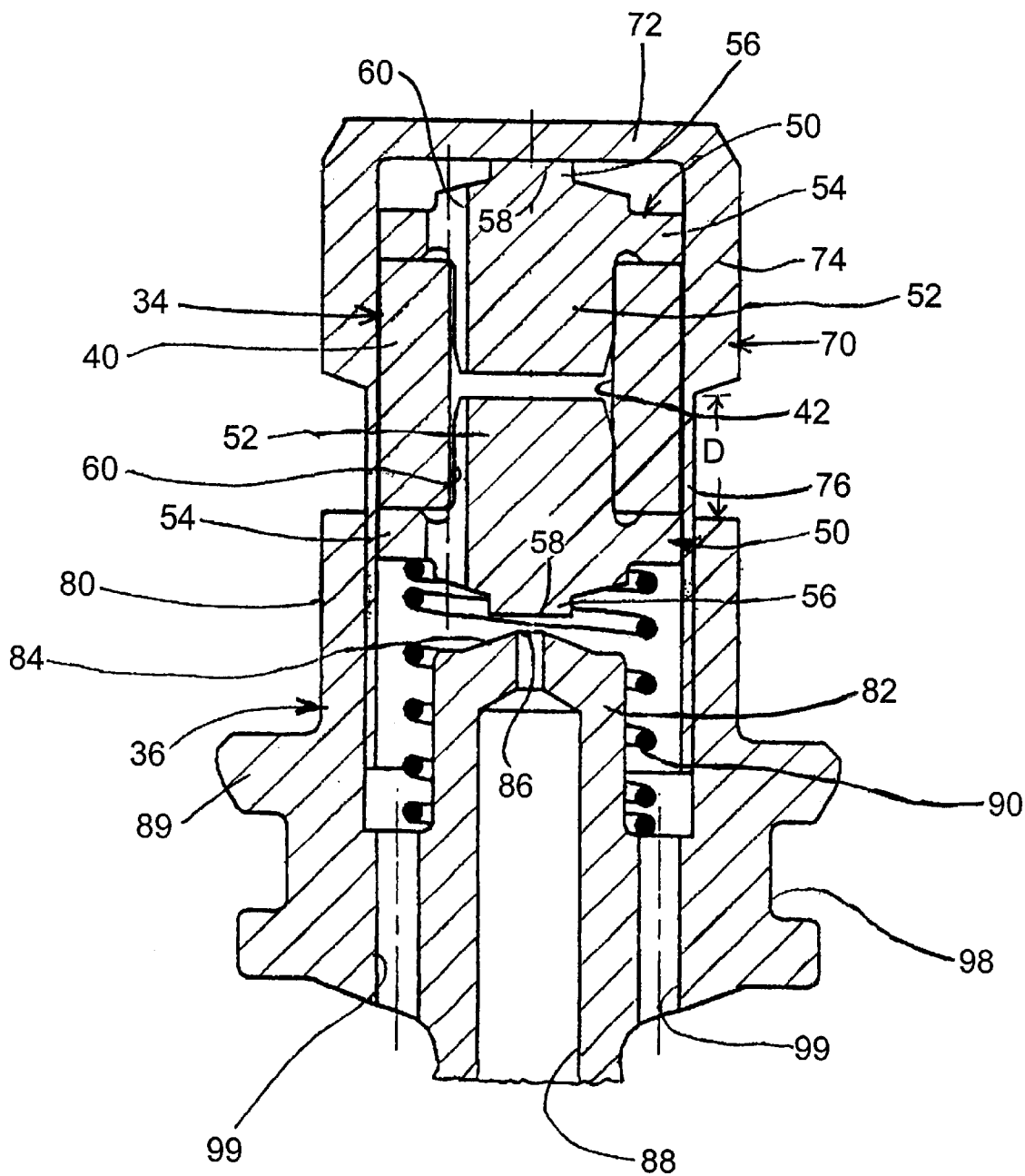
FIG. 3 is an enlarged view of a portion of the control valve of FIG. 2 removed from the hydraulic control unit for clarity of illustration.

A first embodiment of the isolation valve 20 mounted on the housing 19 is illustrated in FIGS. 2 and 3. The isolation valve 20 is received in a bore 30 formed in the housing 19 and retained by an annular lip 32 provided by any desired means. As described below in detail, the isolation valve 20 includes an armature 34 biased away from a valve seat 36 when the valve 20 is not energized. When the valve 20 is energized and produces an electromagnetic flux, the armature 34 is pulled toward the valve seat 36 to reduce fluid flow through the valve 20. At a closed position, the armature 34 is pulled into contact with the valve seat 36 to block fluid flow through the valve 20.

The armature 34 is preferably formed as a subassembly and then assembled with the balance of the valve 20. The armature 34 includes an armature core 40 formed as a hollow cylinder from a ferromagnetic material. The armature core 40 includes a longitudinal (preferably axial) passage 42 originating at a first end 44 of the armature core 40 and terminating at a second end 46 of the armature core 40. The longitudinal passage 42 can be formed as a bore. Preferably the longitudinal passage 42 is formed with a constant diameter.

A pair of bearing elements 50 is formed separately and then mounted on the armature core 40. Each bearing element 50 includes a preferably cylindrical stem 52 and an end cap 54. The diameter of the stem 52 is sized so that the stem 52 can be inserted into the axial passage 42 of the armature core 40. The outer diameter of an end cap 54 is greater than an outer diameter of the armature core 40. Preferably, the stem 52 and end cap 54 are integrally molded from a low-friction material. Suitable materials include moldable materials such as plypthalamide (PPA) 1145 HS available from Amoco and polyphenylene sulfide available from Phillips under the name Ryton R4XT.

Each bearing element 50 includes a projecting stub 56 on an outer surface of the end cap 54 opposite the stem 52. The stub 56 preferably terminates in a planar surface 58. Each bearing element 50 also includes a fluid passage 60 passing through the stem 52 and end cap 54 but not the stub 56.

The bearing elements 50 are mounted on the armature core 40 as their respective stems 52 are received into the first and second ends 44, 46 of the axial passage 42. Preferably, each stem 52 is pressed into the axial passage 42 and retained by an interference fit. The length of each stem 52 is sized so that the stems 52 do not contact each other when two bearing elements 50 are mounted on the armature core 40. When assembled, the armature core 40 and its bearing elements 50 form a symmetrical armature 34.

The armature 34 is slidably inserted into a closed-end flux tube 70. Since the armature 34 is symmetrical, it does not have to be oriented one way or the other prior to insertion. The outer diameter of the end caps 54 is slightly less than an inner diameter of the flux tube 70. The end caps 54 guide the armature 34 as it reciprocates within the flux tube 70 as described below. The end caps 54 also maintain an annular gap between the outer diameter of the armature core 40 and the inner diameter of the flux tube 70. This gap provides a desired magnetic gap in the electromagnetic circuit.

The flux tube 70 includes an end cap 72, a thick tube section 74, and a thin tube section 76 defining an interior volume that receives the armature 34. Preferably, the end cap 72, thick tube section 74, and thin tube section 76 are integrally formed as a single element. Preferably, the thin tube section 76 has a thickness less than half the thickness of the thick tube section 74. Preferably, the flux tube 70 is formed from a ferromagnetic material. In one example, the flux tube 70 can be formed from a closed-end (or dead-end) tube with a section that is thinned by turning. The thin tube section 76 reduces magnetic shunting losses, yet is strong enough to withstand the applied hydraulic forces in the valve 20.

The valve seat 36 is a generally cylindrical element including an annular collar 80 encircling a post 82. Preferably, the collar 80 has a thickness approximately equal to the thickness of the thick tube section 74. The post 82 preferably terminates in an outwardly projecting apex 84. In the embodiment disclosed, the apex 84 includes a conical surface having a planar central section 86. An axial fluid passage 88 is formed in the valve seat 102 that passes through the post 82 and central section 86. An annular flange 89 is secured by lip 32 to retain the valve seat 36 in the bore 30.

A spring 90 is seated on the valve seat 36 about the post 82 to bias the armature 34 away from the valve seat 36. Preferably, a lip seal 92 received in a first groove 94 in the valve seat 36 and an O-ring 96 received in a second groove 98 in the valve seat 36 provide fluid seals between the valve seat 36 and the housing 19. Preferably, a filter assembly 100 is provided at an inlet of the fluid passage 88.

The thin tube section 76 of the flux tube 70 is inserted into the collar 80 of the valve seat 36. Preferably, the flux tube 70 is retained onto the valve seat 36 by an interference fit between the thin tube section 76 and the collar 80 and by any hydraulic pressure applied to an interior volume of the flux tube 70. However, other retention means such as laser welding, inertial or friction welding, gas welding, other forms of welding, or adhesive bonding can be used.

A casing 102 receives a coil 104. Terminal ends 106A and 106B of the coil 104 project through respective openings in the casing 102 and are connected to an electronic control module (not illustrated). A flux ring 108 is fitted into an open end of the casing 102 to retain the coil 104. The casing 102, coil 104, and flux ring 108 are pressed onto outer surfaces of the flux tube 70 and rim 80 and retained as desired.

When the valve 20 is not energized, the spring 90 biases the armature 34 away from the valve seat 36 in an open position, as illustrated in FIGS. 2 and 3. The planar face 58 is spaced from the planar section 86 so that fluid can flow from the axial passage 88 to outlet passages 99 formed in the valve seat 36. The position of the armature 34 is varied towards valve opening (separation of the planar surface 58 and the planar section 86) in proportion to a pressure differential between the inlet passage 88 and the outlet passages 99 of the valve 20.

When the valve 20 is energized, current in the coil 104 creates an electromagnetic force that attracts the armature 34 against the force of the spring 90. When the planar surface 58 contacts the planar section 86, the valve 20 achieves a closed position so that no fluid can flow from the inlet fluid passage 88 to outlet passages 99. The position of the armature 34 is varied towards the closed position in proportion to the magnitude of current through the coil 104.

A predetermined distance D is provided between the thick tube section 74 and the collar 80, thereby leaving a portion of the thin tube section 76 uncovered by the collar 80. In order words, an end surface of the thick tube section 74 is spaced a predetermined distance D from an end surface of the collar 80. An annular air gap G is provided between the uncovered portion of the thin tube section 76 and the coil 104. The air gap G has a high magnetic reluctance that resists magnetic flux. The thin tube section 76 also has a high magnetic reluctance due to its thinness (decreased area) and extended length, despite being made of a ferromagnetic material. When the valve 20 is energized, the high magnetic reluctance of the thin tube section 76 and air gap G cause most of the magnetic flux to flow through the thick tube section 74, armature core 40, and collar 80. Concentration of the magnetic flux in these areas produces a substantially axial magnetic force.

The magnetic circuit formed by the above-described components causes the substantially axial magnetic force exerted on the armature 34 to be proportional to the current applied through the coil 104 and approximately constant, regardless of the travel of the armature 34 in the flux tube 70. This magnetic force, combined with the spring force, causes the pressure differential between the inlet passage 88 and the outlet passages 99 to be a function of the current through the coil 104. Thus, valve 20 provides an output pressure and an output flow rate that is proportional to the current through the coil 104.

Figure 4:
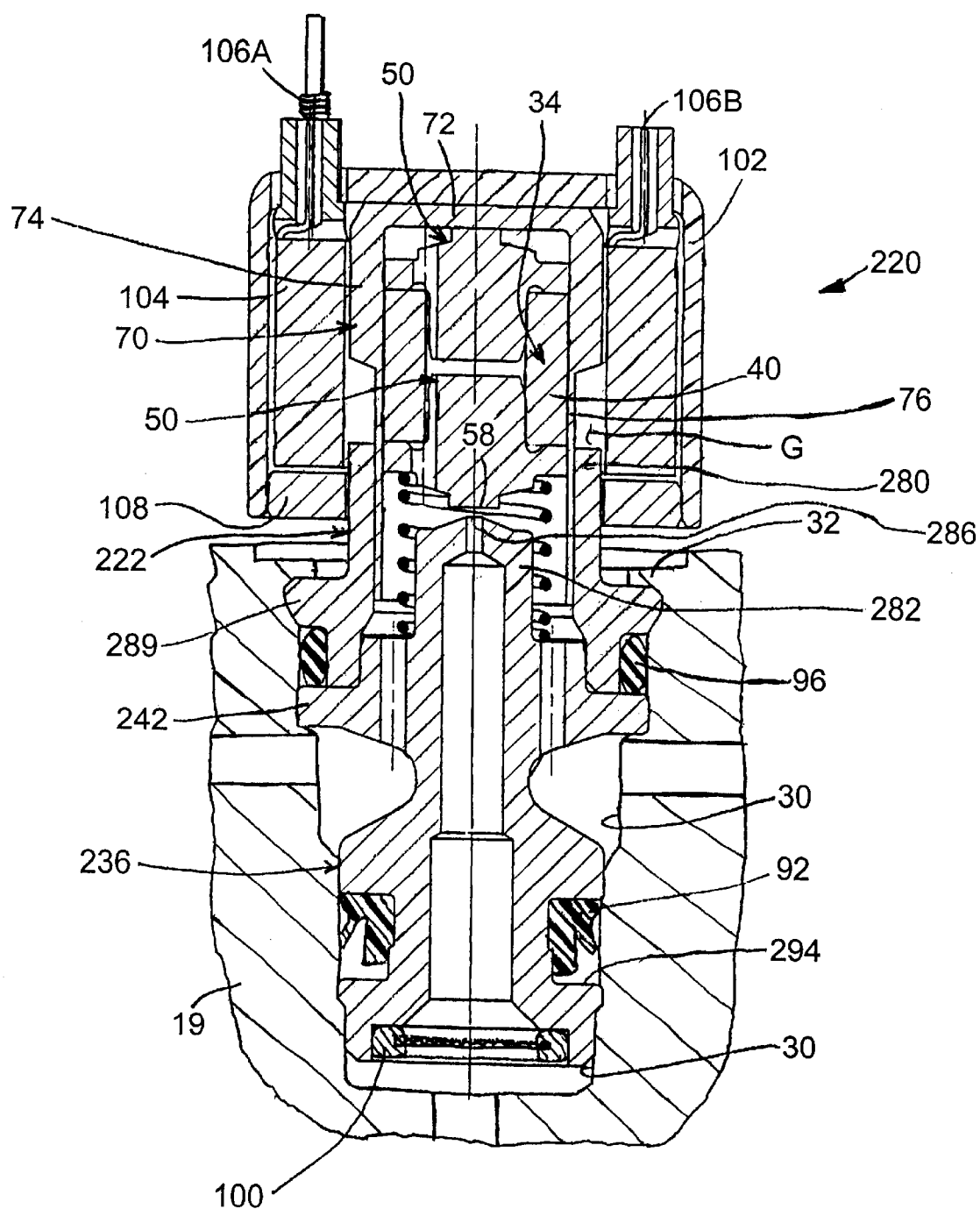
FIG. 4 is a sectional view through a portion of the hydraulic control unit of FIG. 1 illustrating a second embodiment of the normally open control valve according to this invention.
Figure 5:
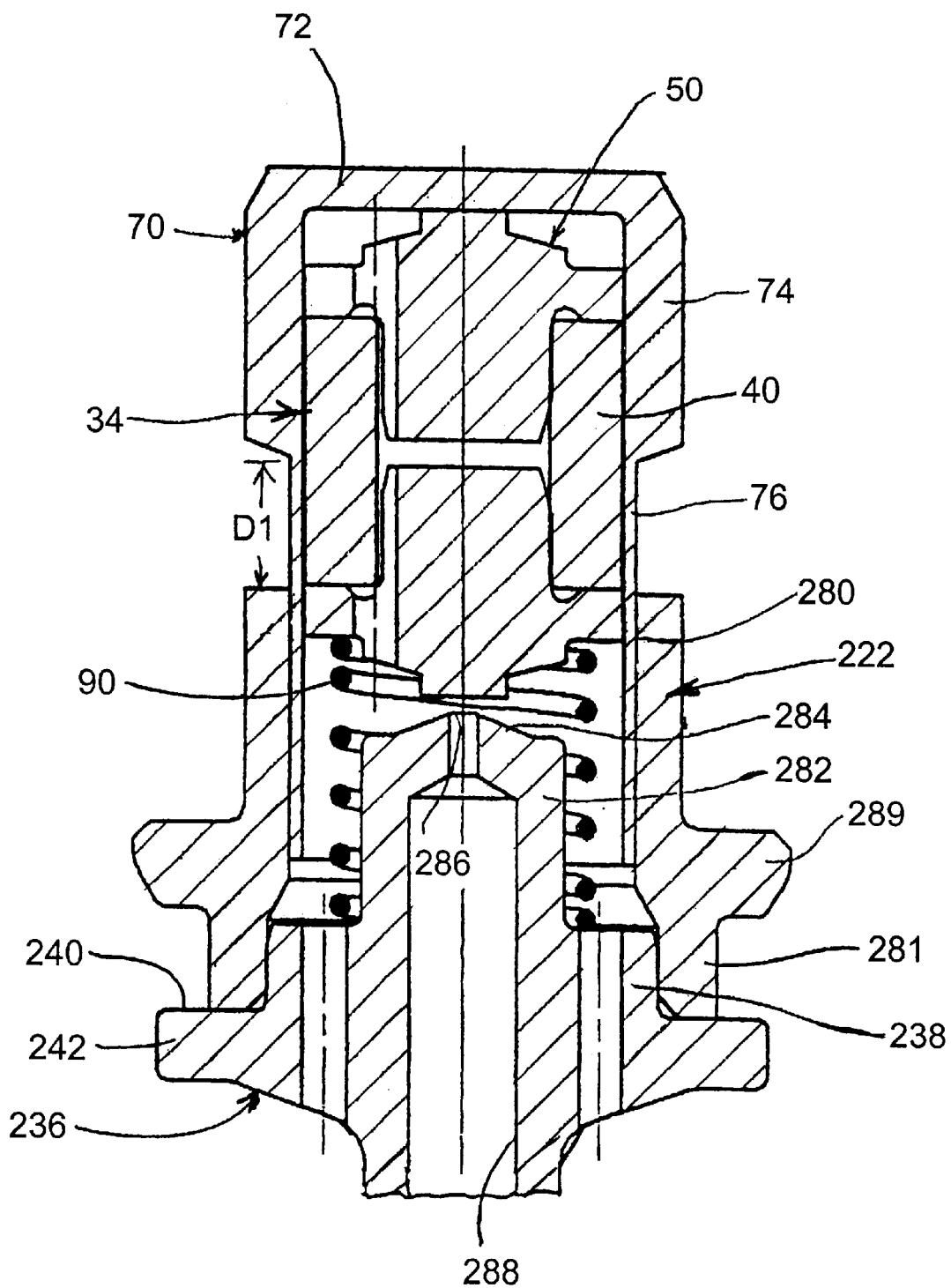
FIG. 5 is an enlarged view of a portion of the control valve of FIG. 4 removed from the hydraulic control unit for clarity of illustration.

A second embodiment of a control valve 220 according to this invention is illustrated in FIGS. 4 and 5. Elements of control valve 220 that are identical to control valve 20 are indicated with the same reference numbers. Control valve 220 includes an armature 34 slidably received in a flux tube 70. The flux tube 70 includes an end cap 72, a thick tube section 74, and a thin tube section 76. A casing 102, a coil 104, and a flux ring 108 are provided over the flux tube 70.

The flux tube 70 is secured to an adapter 222. The adapter 222 is secured to a valve seat 236. A lip 32 of the housing 19 is formed over a radial flange 289 of the adapter 222 to secure the control valve 220 to the housing 19.

The adapter 222 is preferably formed as a hollow, generally cylindrical element having a first annular collar 280 at one end and a second annular collar 281 at an opposite end. The radial flange 289 having an outer diameter greater than the outer diameter of either of the collars 280 and 281 is formed at a central section of the adapter 222 between the collars 280 and 281. Preferably, the adapter 222 is formed from a ferromagnetic material.

The second collar 281 of the adapter 222 is pressed onto the valve seat 236. Preferably, the adapter 222 is retained on the valve seat 236 by an interference fit between the collar 281 and a neck 238 formed on the valve seat 236 and by any hydraulic pressure applied to an interior volume of the adapter 222. However, other retention means such as laser welding, inertial or friction welding, gas welding, other forms of welding, or adhesive bonding can be used to secure the adapter 222 to the valve seat 236. The collar 281 rests on a step 240 provided by a radial flange 242 formed on the valve seat 236.

When the adapter 222 is mounted on the valve seat 236, the first collar 280 encircles a post 282 formed on the valve seat 236. The post 282 preferably terminates in an outwardly projecting apex 284. In the embodiment disclosed, the apex 284 includes a raised conical surface having a substantially planar central section 286. An axial fluid passage 288 is formed in the valve seat 236 that passes through the post 282 and central section 286. A spring 90 is seated on the valve seat 236 about the post 282 to bias the armature 34 away from the valve seat 236.

After the armature 34 is inserted into the flux tube, the thin tube portion 72 of the flux tube 70 is pressed into the first collar 280 of the adapter 222. Preferably, the flux tube 70 is retained on the adapter 222 by an interference fit between the thin tube section 76 and the first collar 280 and by any hydraulic pressure applied to an interior volume of the flux tube 70. However, other retention means such as laser welding, inertial or friction welding, gas welding; other forms of welding, or adhesive bonding can be used. A predetermined distance D1 is provided between the thick tube section 74 and the first collar 280 so that the first collar 280 does not cover a portion of the thin tube section 76. An annular air gap G is provided between the uncovered portion of the thin tube section 76 and the coil 104. The thin tube section 76 and the air gap G result in the concentration of the magnetic flux in the thick tube section 74, armature core 40, and first collar 280. Concentration of the magnetic flux in these areas produces desired magnetic reaction in valve 20.

Preferably, the valve seat 236 is not part of the magnetic circuit created when the control valve 220 is energized. The valve seat 236 does not have to be formed from a ferromagnetic material since it is not part of the magnetic circuit. The valve seat 236 can be formed from a moldable material such as plastic. In a preferred embodiment, the valve seat 236 is formed from plastic.

The substantially planar central section 286 of the valve seat 236 and the end surface 58 of the bearing element 50 cooperate to form valve elements. As the armature 34 is urged toward the post 282, fluid flow is restricted through fluid passage 88 until surface 58 contacts section 286 and fluid flow is blocked. Control of fluid flow through valve 220 can be achieved proportionally by the magnitude of current applied to the coil 104.

A spring 90 is seated on the valve seat 236 about the post 282 to bias the armature 34 away from the valve seat 236. Preferably, a lip seal 92 received in a groove 294 formed in the valve seat 36 and an O-ring 96 received between flanges 289 and provide fluid seals between the valve seat 36 and the housing 19. Preferably, a filter assembly 100 is provided at an inlet of the fluid passage 88.

Control valves 20 and 220 have been illustrated and described as normally open valves. However, by positioning spring 90 between the end cap 72 of the flux tube 70 and the armature 34, it is obvious to one skilled in the art that a normally closed control valve can be configured. A normally closed control valve having a flux tube 70 and a valve seat 36 or an adapter 222 and valve seat 236 is within the scope of this invention.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for controlling fluid flow in a hydraulic control unit comprising:

a valve seat having a fluid passage;

a flux tube having an end cap, a thick tube section, and a thin tube section defining an interior volume;

a coil provided about the flux tube;

an armature slidably received in the interior volume of the flux tube for movement toward the valve seat to close the fluid passage, and movement away from the valve seat to open the fluid passage; and a collar covering a portion of the thin tube section and spaced from the thick tube section so that an air gap is provided between the coil and the portion of the thin tube section not covered by the collar.

2. The control valve defined in claim 1 wherein the collar is formed on a valve seat.

3. The control valve defined in claim 2 wherein the collar encircles a post formed on the valve seat.

4. The control valve defined in claim 3 wherein the post terminates in a substantially planar section.

5. The control valve defined in claim 4 wherein the armature includes a substantially planar surface that cooperates with the planar surface of the post to form valve elements.

6. The control valve defined in claim 1 wherein the collar is formed from a ferromagnetic material.

7. The control valve defined in claim 1 wherein the collar is formed on an adapter.

8. The control valve defined in claim 7 wherein the collar is formed from a ferromagnetic material.

9. The control valve defined in claim 7 wherein the adapter is mounted on a valve seat.

10. The control valve defined in claim 9 wherein the valve seat includes a post encircled by the collar.

11. The control valve defined in claim 10 wherein the post terminates in a substantially planar section.

12. The control valve defined in claim 11 wherein the armature includes a substantially planar surface that cooperates with the planar surface of the post to form valve elements.

13. The control valve defined in claim 9 wherein the valve seat is formed from a molded material.

14. The control valve defined in claim 13 wherein the valve seat is molded from plastic.

15. A hydraulic control unit comprising:

a housing;

a bore formed in the housing;

a collar mounted in the bore;

a valve seat having a fluid passage;

a coil provided about a closed-end flux tube;

the flux tube pressed into the collar, the flux tube including an end cap, a thick tube section, and a thin tube section sized so that the thick tube section is spaced a predetermined distance from the collar wherein an air gap is provided between the coil and a portion of the thin tube section not pressed into the collar;

an armature slidably received in an interior volume of the flux tube for movement toward the valve seat to close the fluid passage, and movement away from the valve seat to open the fluid passage.

16. The hydraulic control unit defined in claim 15 wherein the collar is formed on a valve seat.

17. The hydraulic control unit defined in claim 15 wherein the collar is formed on an adapter.

18. The hydraulic control unit defined in claim 17 wherein the adapter is pressed onto a valve seat provided in the bore of the housing.

19. The hydraulic control unit defined in claim 18 wherein the valve seat is formed from plastic and is not part of the magnetic circuit of the hydraulic control unit.

20. The hydraulic control unit defined in claim 15 wherein the thickness of the thin tube wall section is less than half of the thickness of the thick tube section.

21. A control valve for controlling fluid flow in a hydraulic control unit comprising:

a flux tube having an end cap, a thick tube section, and a thin tube section defining an interior volume;

a coil provided about the flux tube which generates magnetic flux when current is applied through the coil;

an armature slidably received in the interior volume of the flux tube; and a collar covering a portion of the thin tube section and spaced from the thick tube portion so that an air gap is provided between the coil and the portion of the thin tube section not covered by the collar, the thin tube section and the air gap having a high magnetic reluctance that causes most of the magnetic flux to flow through the thick tube section, the armature and the collar to produce a substantially axial magnetic force which is proportional to the current applied through the coil, so that the control valve provides fluid control in a manner proportional to the amount of current applied to the coil.

* * * * *